3,349,121
PROCESS OF REACTING TOGETHER UNSATURATED AMIDES, FORMALDEHYDE, AND SECONDARY AMINES AND THE PRODUCTS FORMED THEREBY
Erwin Müller, Leverkusen, Germany, assignor to Farbenfabriken Bayer Aktiengesellschaft, Leverkusen, Germany, a German corporation
No Drawing. Filed Oct. 15, 1963, Ser. No. 316,456
Claims priority, application Germany, Oct. 15, 1959,
F 29,613
7 Claims. (Cl. 260—513)

This application is a continuation-in-part of application Ser. No. 61,811, filed Oct. 11, 1960, and now abandoned.

The present invention relates to the production of special amines carrying unsaturated amide groups as well as special hydrophilic groups.

It is known to react saturated compounds containing the carbonylamino radical (—CO—NH—) in the molecule with formaldehyde and secondary amines. This reaction, known as the Mannich reaction, produces tertiary bases and proceeds in accordance with the following equation

—CO—NH + CH$_2$O + HN(R)$_2$ ⟶

CO—N—CH$_2$—N(R)$_2$ + H$_2$O

The present invention is concerned with the reaction of olefinically unsaturated compounds containing the carbonylamino radical at least once in the molecule with formaldehyde and those secondary amines which contain at least one of the following hydrophilic groups at least once in the molecule

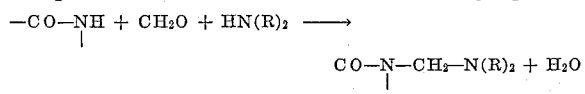

and —CH=CH$_2$, in which M represents an alkali-metal or ammonium radical and R' or R'' represent hydrogen or an alkyl or cycloalkyl radical.

It has now been discovered that the foregoing specified secondary amines do not add to the double bond of the unsaturated carboxylic acid amide but instead form the corresponding unsaturated polymerizable tertiary bases, i.e., bases which still contain a reactive carbon double bond. This discovery was unexpected since it is known that secondary amines very readily add to reactive double bonds (see, for example, the article by Otto Bayer on the chemistry of acrylonitrile in Angewandte Chemie, vol. 61 (1949), pages 234 and 235).

Carboxylic acid amides which can be used for the present process include quite generally those unsaturated compounds which contain one or more carbon-to-carbon double bonds conjugated or isolated in relation to one or more carbonylamino (—CO—NH—) radicals. Particularly important carboxylic acid amides for the present process are α,β-olefinically unsaturated aliphatic monocarboxylic acid amides, especially those having the general Formula I hereinafter

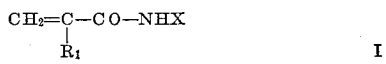

I

In this formula R$_1$ and X may be identical or not and represent hydrogen or a lower aliphatic or cycloaliphatic saturated hydrocarbon straight or branched chain radical and advantageously contain from 1 to 7 carbon atoms.

Compounds of particular importance that are preferably used in the present process are the amides of acrylic and methacrylic acid as well as the substituted amides derived from these acids as, for example, N-methyl-methacrylic acid amide (N-methylmethacrylamide), N-ethylmethacrylic acid amide, N-methylacrylic acid amide, N-ethyl-acrylic acid amide, N-n-propyl-acrylic acid amide.

Secondary amines that are suitable for reacting in accordance with the process of present invention are those which have the general Formula II hereinafter

                               II

In the above formula Y represents

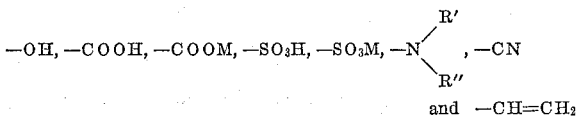

and —CH=CH$_2$ in which M represents an alkali-metal or ammonium radical, R' and R'' may be identical or not and represent hydrogen or an aliphatic or cycloaliphatic saturated hydrocarbon radical containing from 1 to 7 carbon atoms, $x$ is a whole number from 1 to 20, preferably 2 to 4, and R$_2$ is an aliphatic or cycloaliphatic saturated hydrocarbon radical, each having from 1 to 12 carbon atoms, or the radical —(CH$_2$)$_x$—Y, wherein $x$ and Y have the same significance as hereinbefore.

Examples of such compounds are the following: N-methylaminoethane sulphonic acid, N-ethylaminoethane sulphonic acid, N-n-propylaminoethane sulphonic acid, N-n-butylaminoethane sulphonic acid, N-methylaminoacetic acid, 3-N-ethyl-propanesulphonic acid, iminodipropionic acid, 2-aminopropionitrile, iminodipropionic acid nitrile, N - methylethanolamine, diethanolamine, 1-(dimethylamino)-3-(methylamino)propane, and diallylamine.

The reaction of the unsaturated amides and secondary amines is preferably carried out in aqueous solution, advantageously in a solution formed by using a 5 to 30% aqueous solution of formaldehyde but the reaction can also readily be effected in organic solvents. The procedure generally consists in adding the formaldehyde to the unsaturated amides in the form of a 5 to 30%, preferably 5%, aqueous solution, and the secondary amine is run in; the amine may be introduced in the form of an aqueous solution, if desired. A pH value higher than 7 and preferably from 7 to 9 should be maintained during this time. Instead of aqueous formaldehyde solution, paraformaldehyde and other formaldehyde-yielding substances, such as, for example, trioxymethylene, can equally well be used. In general, the quantities of the reactants to be used correspond to molar ratios, but an excess of formaldehyde up to about twice the molar ratio may however be used. Suitable temperatures for carrying out the present process will in general be between 30 and 100° C., preferably between 50 and 80° C. The reactions are in most cases slightly exothermic and are completed by subsequent heating to 70 to 80° C. The reaction generally takes place within a period of 30 minutes to 1 hour. The reaction may be effected in the presence of small amounts of conventional polymerization inhibitors, such as, for example, hydroquinone, tert.-butyl pyrocatechol, phenothiazine and the like, in the usual quantities, i.e., about 0.1 to 2%.

The products obtained in accordance with this process are in general oils which are soluble in water to a certain degree and which polymerize after radical-formers or catalysts, such as peroxides or azo compounds such as 2,2'-azobis[2-methylpropionitrile] whose formula is CN—C(CH$_3$)$_2$—N=N—C(CH$_3$)$_2$—CN, are added in the manner that is conventional in the polymerization art.

The polymerization may be performed in bulk, or the products may be polymerized in solution or in an aqueous dispersion.

The polymerization products in aqueous dispersions contain reactive aminomethylene groups which are split off at elevated temperatures and/or by the action of acid catalysts and simultaneously undergo mutual cross-linking of the resulting polymers with the formation of insoluble cross-linked products. Because of their capacity to form insoluble cross-linked products under mild conditions, these polymers may be used for the production of shaped articles, such as coatings, impregnations and bondings. The process may be carried out by adjusting the dispersions to an acid pH value with suitable acids or compounds having an acid action such as hydrochloric acid, sulphuric acid, phosphoric acid, acetic acid, trichloro acetic acid, ammonium chloride or acid phosphates, then applying the dispersions to a suitable substrate and evaporating the water at elevated temperatures, thus cross-linking the polymers. It is also possible to effect the cross-linking by the action of heat alone, temperatures of about 80 to 200° C., preferably 100 to 150° C., having proved suitable.

Furthermore, these dispersions of polymers may be advantageously used for printing, padding or impregnating textiles or other fibre substrates, since they produce impregnations and dyed or printed textiles that have especially good fastness to washing and rubbing.

EXAMPLE 1

85 grams of methacrylamide is formed into a paste in a small quantity of water and 110 cc. of a 30% formaldehyde solution are added. 105 grams of diethanolamine are then gradually introduced into the solution with stirring, the temperature rising to about 40 to 50° C. Condensation is continued for 1 hour at 70 to 80° C., the substances concentrated by evaporation in vacuo at water bath temperature and 190 grams of a yellow, water-soluble oil is obtained, this oil, which consists essentially of N-(methylacryloylaminomethyl)-N,N-di(2 - hydroxyethyl) amine, polymerizes when 2,2'-azobis[2-methylpropionitrile] is added thereto at a temperature between 80 and 100° C.

EXAMPLE 2

85 grams of methacrylamide are reacted in the manner described in Example 1 with 110 cc. of a 30% solution of formaldehyde and 75 g. of N-methylethanolamine. 165 grams of a yellow water-soluble oil, which consists essentially of N-(methacryloylaminomethyl)-N-(2-hydroxyethyl)methylamine is obtained, this oil polymerizes when 2,2'-azobis[2-methylpropionitrile] is added thereto.

EXAMPLE 3

85 grams of methacrylamide, 110 cc. of a 30% solution of formaldehyde and 97 g. of diallylamine are reacted together according to the procedure described in Example 1. 170 grams of a yellow, water-soluble oil, which consists essentially of N-(methacryloylaminomethyl)-diallylamine is formed, the said oil polymerizes when polymerization accelerators such as cumene hydroperoxide are added thereto.

EXAMPLE 4

85 grams of methacrylamide (1 mol) is formed into a paste in a small quantity of water, and 110 cc. of a 30% solution of formaldehyde and 530 g. of a 34% solution of 2-butylaminoethanesulphonic acid are added thereto. The mixture is heated on a water bath for 1 hour at 70 to 80° C. and concentrated by evaporation in vacuo. The residue is a yellow resin, which is taken up in methanol to remove inorganic salts which were contained in the butylaminoethanesulphonic acid and, after filtering, is concentrated by evaporation in vacuo. 250 grams of a viscous yellow oil which consists essentially of N-(methacryloyl-aminomethyl)-N-(2-sulfoethyl)-butylamine obtained.

In a reaction vessel equipped with a stirrer mechanism and a thermometer 100 parts of the condensation product of methacrylamide, formaldehyde and 2-butylamino- ethanesulphonic acid (condensation product according to the formula

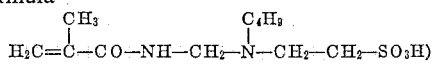

are emulsified in a solution of 250 parts of water, 15 parts of the reaction product of 13 to 15 mols of ethylene oxide and 1 mol of hydroxydiphenylmethane. After the temperature has been raised to 30° C., 0.8 part of potassium persulfate and 0.5 part of sodium pyrosulfite are added. The polymerization is allowed to proceed at about 40° C. After polymerization has been completed a latex containing substantially 30% of polymer is obtained, which is adjusted with ammonia to a pH value of about 7.

A few drops of the foregoing latex or dispersion, after being rubbed dry on the palm of the hand, can be stirred with water again to form the original dispersion. Films produced from the dispersion, after being heated at 120° C. for 5 minutes, show only a very slight swelling when wetted.

EXAMPLE 5

110 milliliters of a 30% solution of formaldehyde and 530 g. of sarcosine (N-methylaminoacetic acid) in the form of a 17% solution are added to 85 g. of methacrylamide under the conditions specified in Example 4. The mixture is heated for 1 hour at a temperature between 70 and 80° C. and, after recovery obtained 176 g. of a water-soluble oil, which consists essentially of N-(methacryloylaminomethyl) - N-(carboxymethyl)methylamine is obtained which polymerizes when benzoyl peroxide is added thereto.

What I claim is:

1. A process which comprises reacting at temperatures from 30 to 100° C. and at a pH of above 7
(1) a compound of the formula:

$$CH_2=C-CO-NHX$$
$$\phantom{CH_2=}|$$
$$\phantom{CH_2=}R_1$$

wherein $R_1$ and X are each selected from the group consisting of hydrogen and alkyl and cycloalkyl containing from 1 to 7 carbon atoms,
(2) formaldehyde, and
(3) a compound of the formula:

$$HN-(CH_2)_x-Y$$
$$|$$
$$R_2$$

wherein $x$ is an integer from 1 to 20, Y is selected from the group consisting of

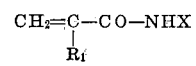

$$-CN \quad \text{and} \quad -CH=CH_2$$

wherein M is selected from the group consisting of alkali-metal and ammonium, R' and R'' are each selected from the group consisting of hydrogen and alkyl and cycloalkyl containing from 1 to 7 carbon atoms and $R_2$ is selected from the group consisting of alkyl and cycloalkyl having from 1–12 carbon atoms and $-(CH_2)_x-Y$ wherein $x$ and Y are as aforesaid, to form a compound of the formula:

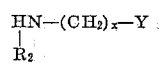

wherein $R_1$, $x$, $R_2$ and X and Y are as aforesaid.

2. A compound of the formula:

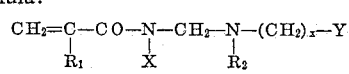

wherein $x$ is an integer from 1 to 20, Y is selected from the group consisting of

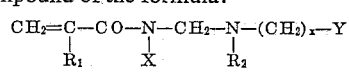

$$-CN \quad \text{and} \quad -CH=CH_2$$

wherein M is selected from the group consisting of alkalimetal and ammonium and R' and R" are each selected from the group consisting of hydrogen and alkyl and cycloalkyl having from 1 to 7 carbon atoms; $R_2$ is selected from the group consisting of alkyl and cycloalkyl having from 1 to 12 carbon atoms and $-(CH_2)_x-Y$ wherein $x$ and Y are as aforesaid; and wherein $R_1$ and X are each selected from the group consisting of hydrogen and alkyl and cycloalkyl containing from 1 to 7 carbon atoms.

3. N - (methacryloylaminomethyl)-N,N-di(2-hydroxyethyl)amine.

4. N - (methacryloylaminomethyl) - N-(2-hydroxyethyl)methylamine.

5. N - (methyacryloylaminomethyl)-N-(2-sulfoethyl)-

6. N-(methacryloylaminomethyl) - N - (2-sulfoethyl)-n-butylamine.

7. N - (methacryloylaminomethyl)-N-(carboxymethyl)methylamine.

References Cited

UNITED STATES PATENTS 2,649,438  8/1953  Bruson.

FOREIGN PATENTS 223,689  8/1959  Australia.
576,998  6/1959  Canada.
812,073  4/1937  France.
641,865  2/1937  Germany.
446,912  5/1936  Great Britain.
482,897  4/1938  Great Britain.

RICHARD K. JACKSON, *Primary Examiner*

LORRAINE A. WEINBERGER, *Examiner.*

M. WEBSTER, *Assistant Examiner.*